UNITED STATES PATENT OFFICE.

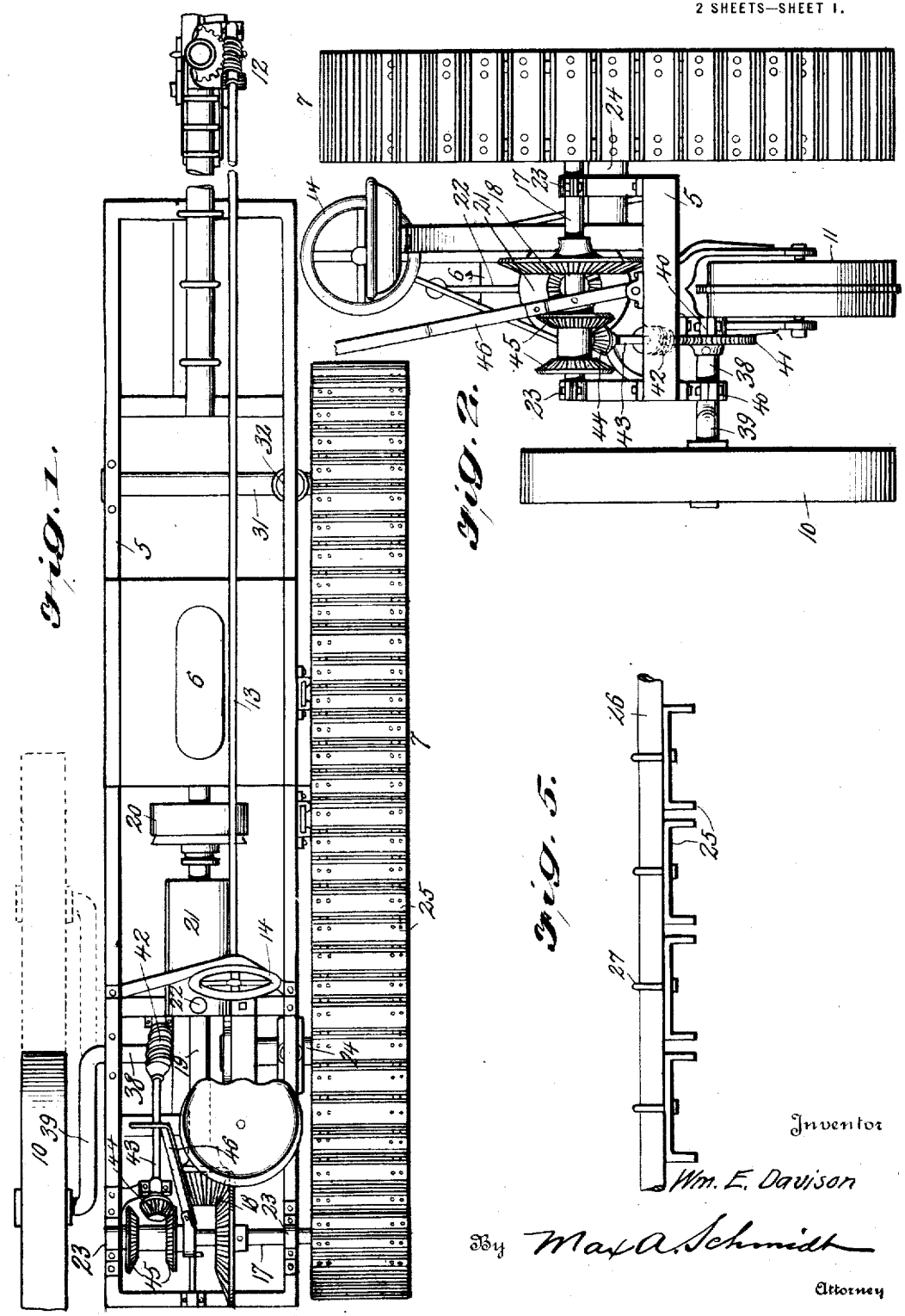

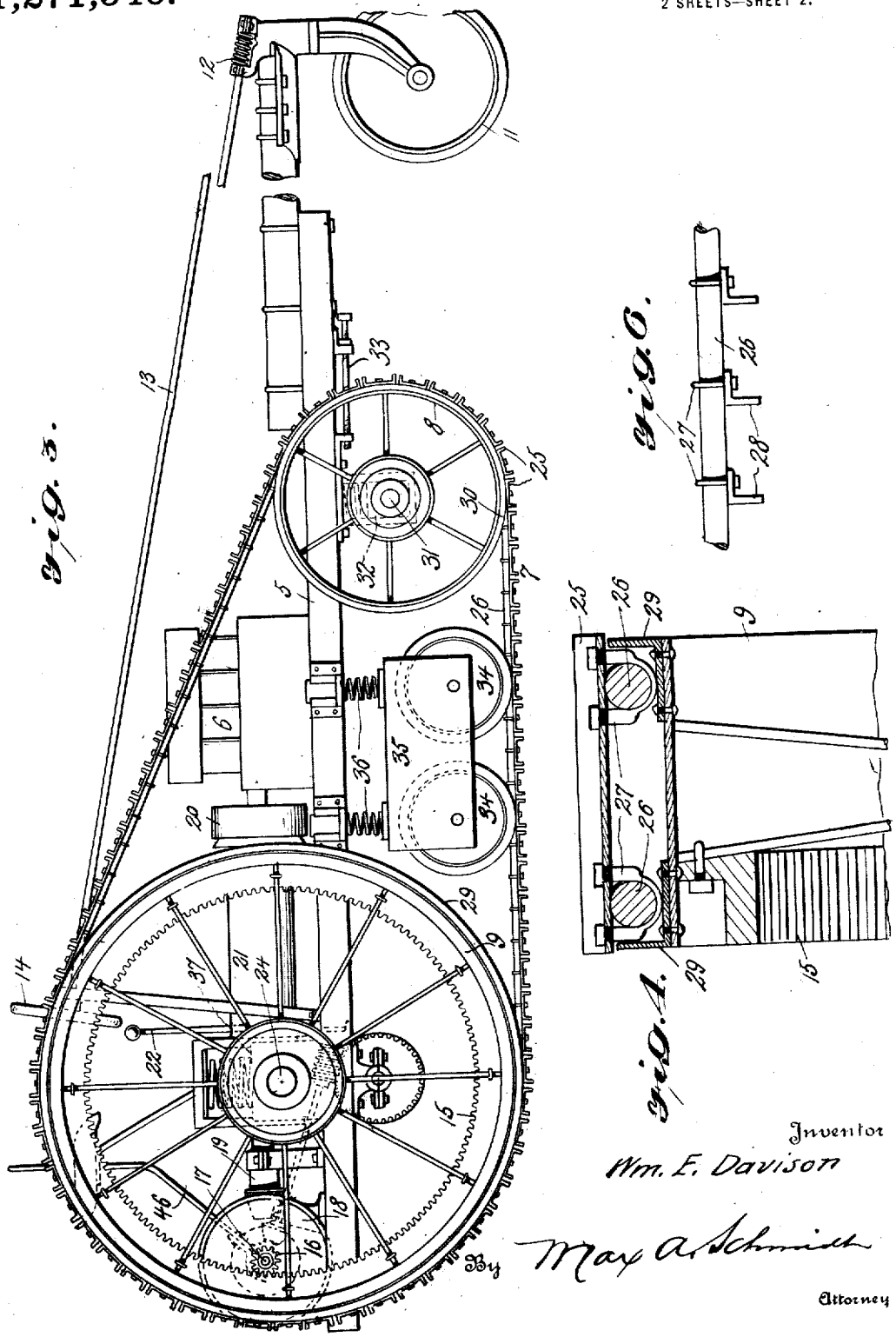

WILLIAM E. DAVISON, OF HAMMER, WASHINGTON.

TRACTOR.

1,271,546.     Specification of Letters Patent.     Patented July 9, 1918.

Application filed June 1, 1917. Serial No. 172,317.

*To all whom it may concern:*

Be it known that I, WILLIAM E. DAVISON, a citizen of the United States, residing at Hammer, in the county of Walla Walla and State of Washington, have invented certain new and useful Improvements in Tractors, of which the following is a specification.

This invention relates to tractors of the endless track or caterpillar type and its object is to provide a novel and improved means for controlling and leveling the same as will be pointed out in the detailed description appearing hereinafter.

In order that the invention may be better understood, reference is had to the accompanying drawings form a part of this specification, and in said drawings—

Figure 1 is a plan view of the tractor; Fig. 2 is a rear elevation thereof; Fig. 3 is a side elevation; Fig. 4 is an enlarged cross-section of the traction element; Fig. 5 is a side elevation of a fragment of the traction element, and Fig. 6 is a side elevation showing a slightly modified form of traction element.

Referring specifically to the drawings, 5 denotes the supporting frame of the machine, the same being constructed and arranged in any suitable manner to support the engine 6 and other parts to be presently described. The machine is of the endless track or caterpillar type, it being propelled by an endless belt 7 trained over front and rear supporting wheels 8 and 9. The engine may be an ordinary internal-combustion engine. The traction belt is positioned at one side of the machine, and on the other side the machine is supported on a leveling wheel 10. The front end of the machine is supported by a steering wheel 11 operated by a suitable worm steering gear 12. The steering shaft 13 extends rearward and is provided with a hand wheel 14.

The rear supporting wheel 9 of the traction belt 7 is employed for driving the latter, said wheel having an internal gear 15 with which meshes a pinion 16 on a countershaft 17 connected by a bevel gearing 18 to a propeller shaft 19 driven by the engine 6, a suitable clutch 20 of any type being provided for controlling the propeller shaft. A suitable transmission gear inclosed in a case 21 is also provided, and as this gear forms no part of the present invention it has not been illustrated. The controlling lever associated with the transmission gear is shown at 22. The countershaft 17 is supported in bearings 23 on the frame 5. The wheel 9 is mounted on a stub shaft or axle 24 suitably supported by the frame 5.

The endless traction belt 7 is made up of parallel cross bars 25 connected by two endless cables 26 by U-bolts 27. The cross bars are channel irons so positioned that the flanges point outward to obtain traction spurs. Angle bars 28 may be substituted for the channel irons as shown in Fig. 6 to prevent "packing" which might occur with the latter.

The internal gear 15 is secured to the wheel 9 in any suitable manner, and to the periphery of the rim of said wheel are riveted or otherwise secured angle irons 29 which are arranged to form, with the rim, a channel in which the traction belt seats and is guided. The rim of the front wheel 8 is also fitted with angle irons 30 to form a guide channel for the traction belt. The wheel 8 is mounted on an axle 31 supported in a spring backed bearing box 32 adjustable longitudinally of the frame 5 so that the traction belt may be tightened. A screw 33 is provided for adjusting the bearing box for the purpose stated.

Between the front and rear wheels 8 and 9 are located two idler wheels 34 positioned to engage the lower run of the traction belt 7 and hold the same pressed down against the ground. These idler wheels are carried by a vertically movable support 35 carried by the frame and pressed downward by springs 36. The shaft or axle 24 of the wheel 9 is also supported in a spring backed bearing box 37.

The machine is leveled by means of the wheel 10. This wheel is carried by a transverse rock shaft 38 having a crank bend or offset 39 on which the wheel is journaled. It will therefore be seen that the center of the wheel does not coincide with the axis of the shaft 38, but is offset therefrom, and hence when the shaft is rocked, the wheel is elevated or lowered with respect to the frame 5, and the latter may therefore be kept level on the side of a hill. In its normal position, the wheel 10 is at the rear end of the machine 5, but it can also be thrown forward as shown dotted in Fig. 1, by operating the rock shaft 38. By throwing the wheel forward the weight of the machine is more evenly distributed on the traction belt 7, which is advantageous when descending a hill. When the wheel is in its normal rearmost position, the weight of the machine is thrown more on the forward end of the traction belt, and this is advantageous when climbing a hill as it will give a greater grip on the ground at the front end of the traction belt, or a greater toe hold as it were.

The leveling wheel 10 is controlled by the following means:

The shaft 38 is supported in bearings 40 on the frame 5, and has a worm wheel 41 with which meshes a worm 42 the shaft 43 of which has a bevel pinion 44 adapted to mesh with one or the other of a pair of bevel gears 45 on the countershaft 17. The gears 45 are slidable on the countershaft so that either one may be placed in mesh with the pinion 44 according to the direction the shaft 38 is to be rocked, the wheel 10 being thus carried up or down, or forward or back. A hand lever 46 is provided for shifting the gears 45.

I claim:

1. A tractor comprising a frame, an endless traction belt and supporting wheels for the belt on one side of the frame, means for driving the belt, a leveling wheel on the other side of the frame, and a swinging support for the leveling wheel adjustable to elevate and lower said wheel relative to the frame and also to position the wheel in advance of and to the rear of the pivotal axis of the support, to vary the position of said wheel in the direction of the length of the frame.

2. A tractor comprising a frame, an endless traction belt and supporting wheels for the belt on one side of the frame, means for driving the belt, a wheel on the other side of the frame, and a swinging support for the wheel adjustable to position the wheel in advance of and to the rear of the pivotal axis of the support, to shift said wheel forward and rearward of the frame.

In testimony whereof I affix my signature.

WILLIAM E. DAVISON.

Witnesses:
M. C. ZINTHEO,
MAUD E. HAYS.